UNITED STATES PATENT OFFICE.

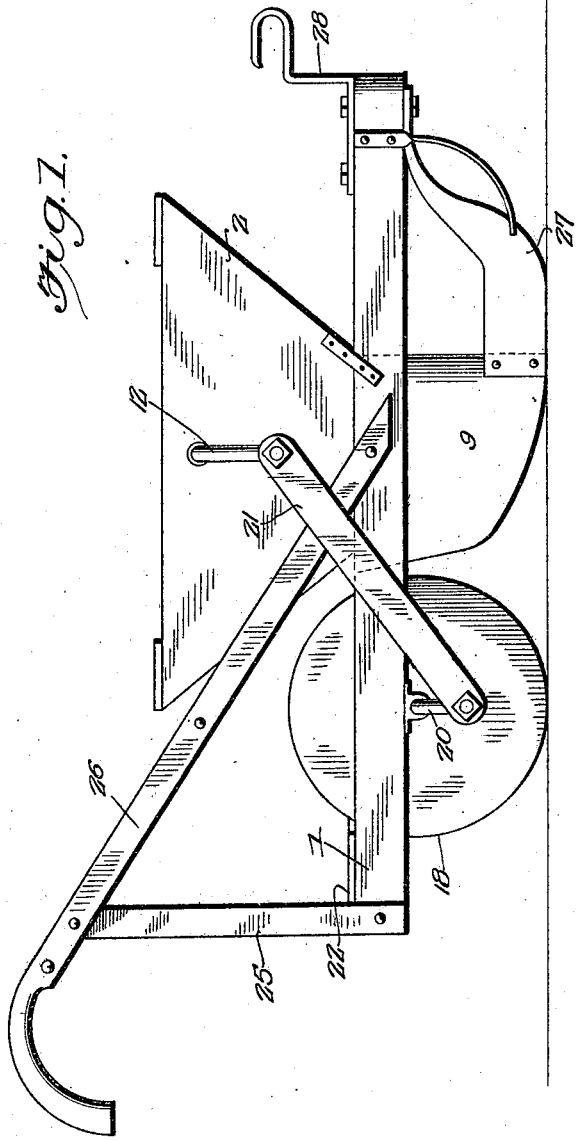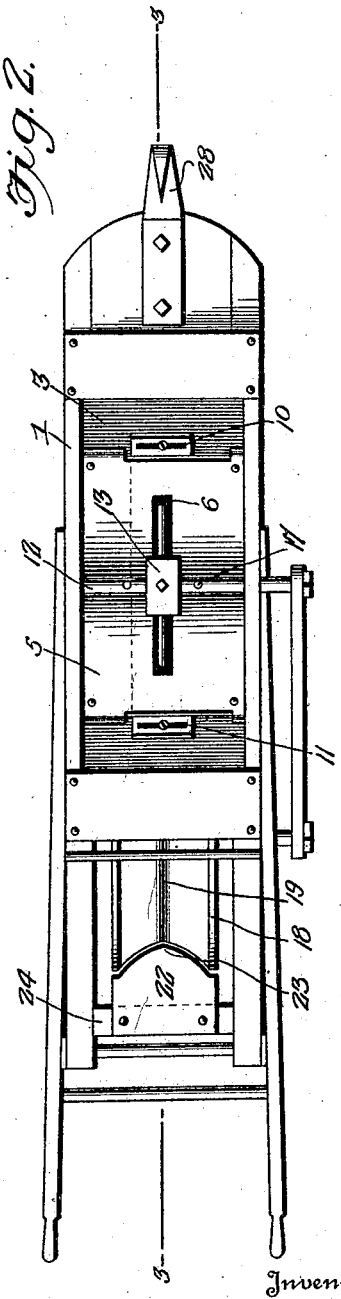

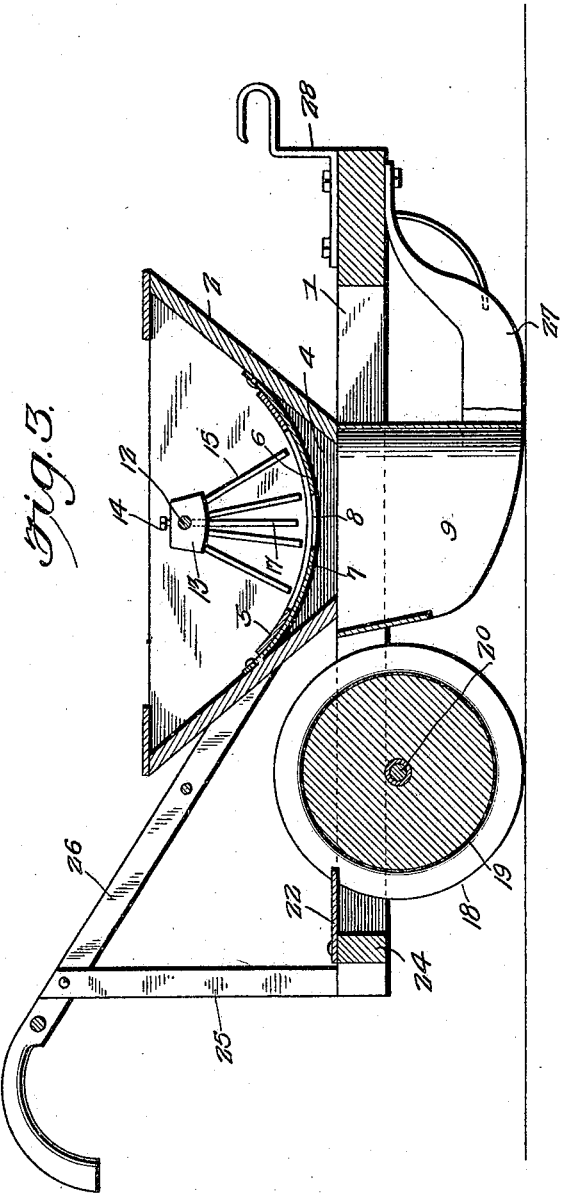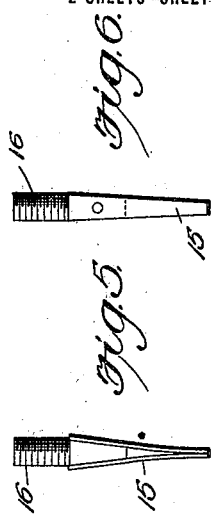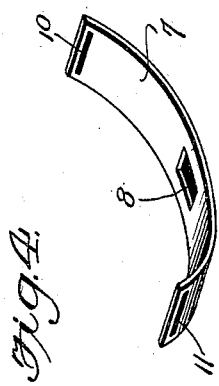

WILLIAM C. CATLETT, OF PRITCHETT, TEXAS.

PLANTER.

1,395,798.  Specification of Letters Patent.  Patented Nov. 1, 1921.

Application filed October 20, 1920. Serial No. 418,218.

*To all whom it may concern:*

Be it known that I, WILLIAM C. CATLETT, a citizen of the United States, residing at Pritchett, in the county of Upshur and State of Texas, have invented certain new and useful Improvements in Planters, of which the following is a specification.

This invention relates to planters and more particularly to that class of planting machines in which the hopper is provided with an agitator in the bottom thereof which will prevent the seed from choking up the feed opening and thus produce a continuous and positive flow of seed through the opening to the drill.

One of the objects of my invention is the construction of a planter of the above type wherein the agitator is provided with resilient feeder fingers coöperating with a horizontal slide or cut off in the bottom of the hopper whereby a regular and continuous flow of seed will be had as the planter travels over the ground.

A further object is to provide a planter which will be extremely simple in construction, comprising comparatively few parts, cheap to manufacture, neat in appearance and efficient and positive in operation in different kinds of soil.

With these objects in view and others which will be manifest and suggested as the nature and purpose of my invention are revealed in the following specification and drawing wherein I have shown a practical, yet preferred embodiment thereof, Figure 1 is a side view of my planter.

Fig. 2 is a plan view of the same.

Fig. 3 is a longitudinal sectional view taken on the line 3—3 of Fig. 2.

Fig. 4 is a detail view of slide or cut off in the bottom of the hopper.

Figs. 5 and 6 are detail views of the resilient feeder fingers.

Referring now to the drawings numeral 1 designates a rectangular frame having permanently mounted thereon a hopper 2 which is preferably triangular in shape, having end walls 3 and bottom opening 4, wherein a curved plate or false bottom 5 is secured. The longitudinal slot 6 in the false bottom is adapted to be closed by a curved laterally slidable, cut off plate 7 provided with a central opening 8 through which the seed may fall to the drill 9. The cut off plate 7 is also provided with transverse slots 10, 11 which permit the said cut off to be adjusted with respect to the opening in the false bottom and thereby regulate the flow of seed.

A crank shaft 12 mounted in the vertical sides of the hopper is provided with an apertured block 13 held thereon by a thumb screw 14, the said block being provided with a plurality of screw threaded apertures for the reception of resilient fingers 15, screw threaded as at 16. Additional fingers 17 are also provided on said shaft and agitate the seed within the hopper.

A rear supporting wheel 18 rotatably mounted between the sides of the frame is preferably grooved as shown at 19 and acts as a coverer for the seed dropped through the drill. The crank shaft 20 supporting the wheel 18 is connected to the crank shaft 12 by the pitman 21 and as will be apparent when the machine is in motion the shaft 12 will oscillate the block 13 and its fingers and thus agitate the seed within the hopper.

A substantially rectangular scraping plate 22 having a curved edge 23 conforming to the shape of the groove in the supporting wheel is secured to the rear cross beam 24 of the frame. Vertical brace bars 25 secured to the sides of the frame are also secured to the angularly extending handles 26 which are permanently fastened to and intermediate of the frame. The drill 9 is also provided with the usual furrow opener 27 secured to the underside of the front portion of the frame and a clevis member 28, to which the draft animals are hitched, is positioned forwardly of the said frame.

From the above description it will now be seen that I have provided a comparatively simple and very efficient planter wherein motion is communicated to the agitating means within the hopper by the travel of the machine and, by providing the agitating means with a plurality of resilient fingers, a constant and steady flow of seed will be dropped to the ground. It will of course be understood that by adjusting the sliding plate 7 the quantity of seed dropped may be regulated to suit the needs of the farmer it being recognized that under certain conditions seed is planted more freely than in others.

In the accompanying drawing, I have illustrated my invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

What I claim is:

In a seed distributing mechanism of the class described comprising a hopper provided with a false bottom therein, a curved plate having a registering discharge opening below and laterally adjustable with respect to the opening in said false bottom, a crank shaft pivoted between the sides of the said hopper, means to operate said shaft, a curved block mounted on and oscillatable with said crank shaft, agitating fingers carried by said shaft, and a plurality of resilient, agitating fingers threaded and secured in the bottom of said block and operable in the opening in said false bottom for agitating the seed and directing its continuous flow to the opening in the adjustable curved plate.

In testimony whereof, I affix my signature hereto.

WILLIAM C. CATLETT.